R. HARROUN.
STEERING WHEEL.
APPLICATION FILED FEB. 16, 1917.

1,280,724.

Patented Oct. 8, 1918.

Inventor
Ray Harroun

By Whittemore Hulbert & Whittemore
Attorneys

UNITED STATES PATENT OFFICE.

RAY HARROUN, OF HIGHLAND PARK, MICHIGAN, ASSIGNOR TO HARROUN MOTORS CORPORATION, OF WAYNE, MICHIGAN, A CORPORATION OF DELAWARE.

STEERING-WHEEL.

1,280,724.          Specification of Letters Patent.          Patented Oct. 8, 1918.

Application filed February 16, 1917. Serial No. 149,116.

*To all whom it may concern:*

Be it known that I, RAY HARROUN, a citizen of the United States of America, residing at Highland Park, in the county of Wayne and State of Michigan, have invented certain new and useful Improvements in Steering-Wheels, of which the following is a specification, reference being had therein to the accompanying drawing.

This invention relates to steering wheels such as are employed in connection with automobiles or the like.

Among the objects of the invention are to provide a construction in which the steering wheel will absorb the road shocks; to provide a construction in which the spider arms of the steering wheel are constructed in the form of leaf springs so as to give a yielding movement of the rim of the steering wheel in a direction parallel to the axis of the post, while preventing lateral movement; to so construct and arrange the parts that the vibrations transmitted to the steering post will not be carried through the steering wheel to the driver's hands; and in general to provide a new steering wheel of the character above referred to.

Figure 1:
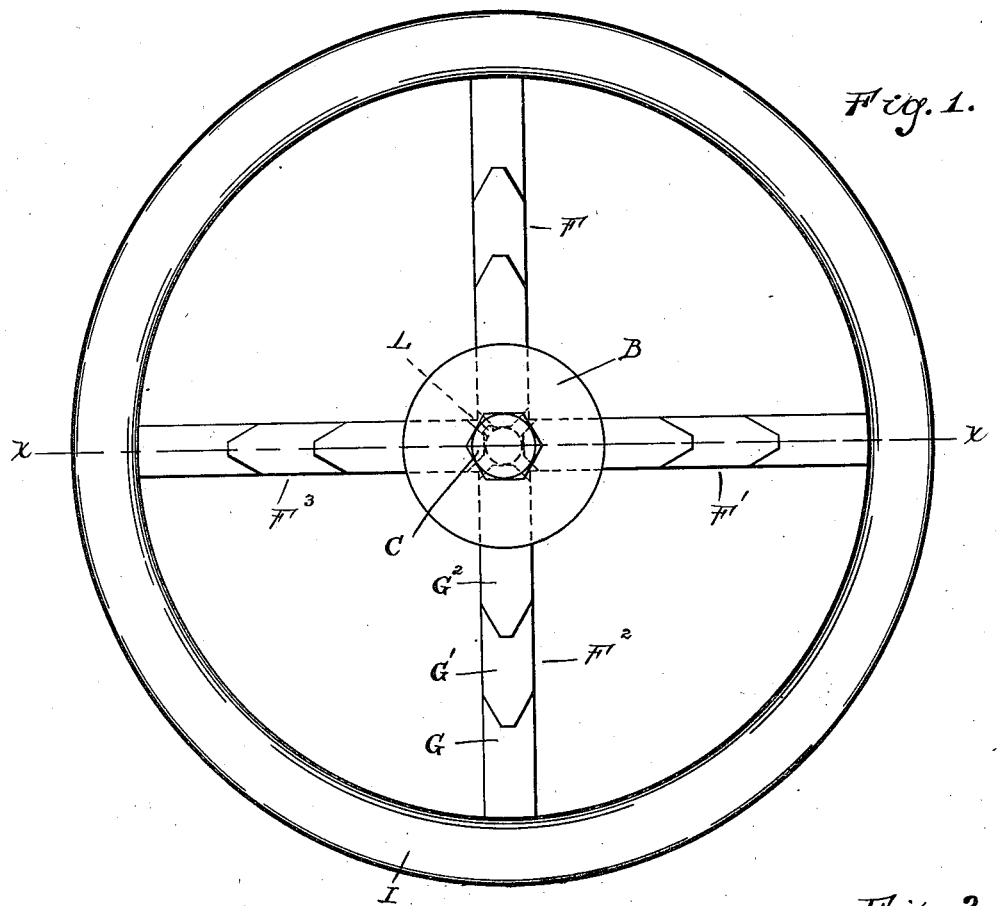
Figure 1 is a top plan view of a steering wheel embodying my invention.
Figure 2:
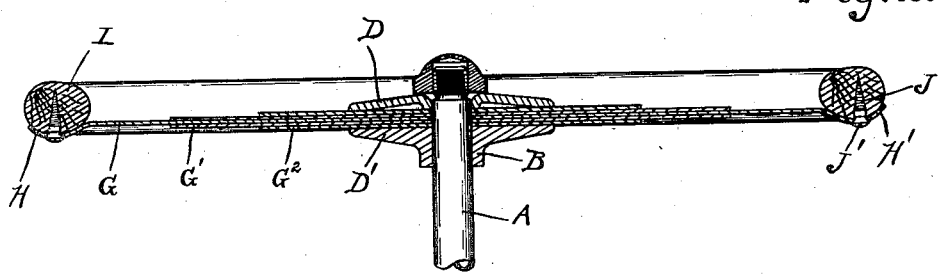
Fig. 2 is a vertical section on the line $x$—$x$ of Fig. 1.

The present invention contemplates a novel steering wheel for automobiles or the like, the rim of which has an up and down resiliency, while it is held from lateral yielding movement and the particular construction shown in the drawings is as follows:

Mounted upon the steering post A is a head B secured thereto by a suitable cap C. This head forms the hub of the steering wheel and from its bearing portions D, D', etc., there projects spider arms F, F', $F^2$ and $F^3$. These arms are made up of overlapping leaves G, G' and $G^2$, which in effect form leaf springs having at their outer ends curved seats H and H' secured to the wooden rim or gripping portion I by suitable wood screws J having counter-sunk heads J'. The head B is keyed to the post A by any suitable means, such as the key L and as the spider arms are continuous from side to side, any lateral movement of the rim I relative to the post A is prevented. However, since the spider arms supporting the rim are formed of leaf springs, the rim is permitted sufficient up and down movement, that is, in a direction parallel to the plane of the axis of the steering post, to prevent the transmission of any vibrations from the post to the rim of the steering wheel.

Thus while a sufficiently rigid construction laterally is maintained for the proper steering of the vehicle, the vibrations which are annoying in steering wheels of ordinary construction are avoided.

What I claim as my invention is:

1. In a steering wheel, the combination with a steering post, of a steering wheel having a hub connected to said post, a rim, and connections between said hub and rim comprising overlapping leaf spring members one of which has its outer end rigidly secured to the rim.

2. In a steering wheel, the combination with a steering post, of a steering wheel having a hub connected to said post, a rim, connections between said hub and rim comprising overlapping leaf spring members one of which has its outer end rigidly secured to the rim, and the inner end of said leaf spring members being clamped to the hub portion of the wheel.

In testimony whereof I affix my signature.

RAY HARROUN.